US008377289B2

(12) United States Patent
Li et al.

(10) Patent No.: US 8,377,289 B2
(45) Date of Patent: Feb. 19, 2013

(54) COMPOSITE METAL OXIDE CATALYST AND METHOD FOR PREPARATION AND APPLICATION THEREOF

(75) Inventors: Can Li, Dalian (CN); Zongxuan Jiang, Dalian (CN); Lu Wang, Dalian (CN)

(73) Assignee: Dalian Institute of Chemical Physics, Chinese Academy of Sciences, Dalian (CN)

( * ) Notice: Subject to any disclaimer, the term of this patent is extended or adjusted under 35 U.S.C. 154(b) by 572 days.

(21) Appl. No.: 12/666,109

(22) PCT Filed: Nov. 26, 2008

(86) PCT No.: PCT/CN2008/001934
§ 371 (c)(1),
(2), (4) Date: Dec. 22, 2009

(87) PCT Pub. No.: WO2009/117863
PCT Pub. Date: Oct. 1, 2009

(65) Prior Publication Data
US 2010/0193402 A1    Aug. 5, 2010

(30) Foreign Application Priority Data
Mar. 28, 2008  (CN) .......................... 2008 1 0010795

(51) Int. Cl.
*C10G 35/06*  (2006.01)
(52) U.S. Cl. ..... 208/217; 208/123; 208/124; 208/216 R; 208/243; 208/244; 502/313; 502/315; 502/316

(58) Field of Classification Search .................. 208/123, 208/216 R, 243, 124, 217, 244; 502/313, 502/315, 316
See application file for complete search history.

(56) References Cited

U.S. PATENT DOCUMENTS

| 6,156,695 | A | 12/2000 | Soled et al. |
| 6,162,350 | A * | 12/2000 | Soled et al. .................. 208/113 |
| 6,197,273 | B1 * | 3/2001 | Nagano et al. ............. 423/419.1 |
| 6,299,760 | B1 | 10/2001 | Soled et al. |
| 6,712,955 | B1 | 3/2004 | Hou et al. |
| 6,758,963 | B1 | 7/2004 | Hantzer et al. |
| 6,783,663 | B1 | 8/2004 | Riley et al. |
| 2002/0065441 | A1 * | 5/2002 | Eijsbouts et al. ............. 585/276 |
| 2006/0060503 | A1 * | 3/2006 | Soled et al. ................ 208/111.3 |

FOREIGN PATENT DOCUMENTS
CN           1840617 A      10/2006
* cited by examiner

*Primary Examiner* — Brian McCaig
(74) *Attorney, Agent, or Firm* — Eshan Hong; VLP Law Group

(57) ABSTRACT

A complex metal oxide catalyst comprising a Group VIII metal $M_I$ and at least two Group VIB metals $M_{II}$ and $M_{III}$, wherein the molar ratio of Group VIII metal $M_I$ to Group VIB metals $M_{II}+M_{III}$ is 1:9-9:1 and the molar ratio of the Group VIB metals $M_{II}$ and $M_{III}$ is 1:5 to 5:1. When applied to the hydrodesulfurization of diesel, the catalyst exhibits a super high HDS activity. The sulfur level in the diesel can be reduced from 1200 ppm to 27 ppm under a gentle operating condition.

13 Claims, 2 Drawing Sheets

US 8,377,289 B2

COMPOSITE METAL OXIDE CATALYST AND METHOD FOR PREPARATION AND APPLICATION THEREOF

PRIORITY CLAIM

This is a U.S. national stage of application No. PCT/CN2008/001934, filed on Nov. 26, 2008. Priority is claimed on the following application: China Application No.: 200810010795.9, Filed on Mar. 28, 2008, the content of which is incorporated here by reference.

FIELD OF THE INVENTION

This invention relates to ultra-deep hydrodesulfurization (HDS) of diesel. More particularly speaking, this invention relates to a composite metal oxide catalyst and method for preparation and application thereof. This catalyst has the active species with a multi-metal oxide composite structure, and consequently exhibits a super high HDS activity.

BACKGROUND OF THE INVENTION

As more stringent environmental regulations enacted throughout the world, the sulfur content in fuel is demanded to a much lower level. However, the sulfur content of remained crude oil is becoming higher in the world year after year. So the development of more active ultra-deep HDS catalysts of diesel has been a challenging subject worldwide. SOx from the burning of organic sulfur-containing compounds present in fuel oils not only can cause acid rain, but also can poison irreversibly the three-way catalysts in the tail gas cleanup systems of engines. Therefore, it has been receiving much attention.

So, all countries in the world have enacted much more stringent sulfur specifications of diesel. The Chinese government will implement the sulfur specifications equal to Europe IV emission standard (<50 ppm) in Jul. 1, 2010. Big cities in China, such as Beijing and Shanghai, will advance two years to implement the standard. So, it is an urgent need for developing a new catalyst with super high HDS activity to meet ultra-deep hydrodesulfurization of diesel.

Currently, the industrial HDS catalysts have a very similar composition, in which a Group VIII metal such as Co or Ni acts as a promoter, and a Group VIB metal such as molybdenum or tungsten acts as an active component of the catalyst. The catalysts are supported on porous-alumina or silica-alumina oxide. Some of additives (such as B, Ti, P and Si) can be added to improve the catalytic performance of the catalysts. However, it is difficult to remove the sulfur-containing compounds of the alkyl substituted polycyclic aromatic thiophenes present in liquid fuels, such as dibenzothiophene (DBT) and 4,6-dimethyldibenzothiophene, with the traditional catalyst.

Furthermore, $MoS_2$ catalyst is easy to be poisoned and deactivated in the process of hydrogenation of heavy oil. It is demanded to develop a new catalytic system to adapt ultra-deep HDS for liquid fuels and deep processing of heavy oil. Compared with the huge investment costs in the adjusting process operating conditions and building new reactors, the development of a new HDS catalyst based on the existing operating conditions which can be used in an existing production unit is a much more economical and feasible method.

It is well known for those skilled in the art that the HDS activity of traditional supported catalysts is hard to be improved by a large margin because the support itself has only limited catalytic effect, thus the activity of catalyst could only be improved by increasing the contact area between the support and reagent compounds or using the synergistic effect between the support and the active species. However, the multi-metal bulk catalyst, in other words, the unsupported multi-metal catalyst is a new generation catalyst with super high HDS activity because it has different kinds of active species and much more active sites than supported catalyst. In the recent references and patents, it has attracted much more attention due to having extremely high HDS activity.

In the U.S. Pat. Nos. 6,299,760, 6,156,695, 6,783,663, 6,712,955 and 6,758,963, the preparation methods and applications of new NiMoW unsupported catalysts were reported. It was found that this new NiMoW catalyst exhibited the HDS activity which is 3 times higher than that of a commercial catalyst. In the preparation method of the catalyst, NiMoW catalyst precursor is formed through reaction wherein ammonia was used as chelating agent, followed by calcination and sulfidation to form the final NiMoW catalyst. The preparation method had obvious disadvantages that the use of concentrated aqueous ammonia could cause pollution to the environment and that the cost for the preparation of catalyst was high.

It is obviously found from the prior art that the preparation method of the multi-metal bulk catalyst has some disadvantages: (1) The reagent is not environmental friendly; (2) The preparation cost of catalyst is relatively high; and (3) The HDS activity of catalyst needs to be further improved.

SUMMARY OF THE INVENTION

In accordance with this invention, an objective of the invention is to provide a composite metal oxide catalyst with high activity and method for the preparation and the application thereof.

In order to achieve the above objective, this invention provides the following aspects:

(1) A composite metal oxide catalyst, which is comprised of at least one type of Group VIII metal and at least two types of Group VIB metals, wherein the molar ratio of the at least one type of Group VIII metal to the at least two types of Group VIB metals is from 1:9 to 9:1 and among the at least two types of Group VIB metals, the molar ratio of the 2 largest contents of the metals is from 1:5 to 5:1.

(2) The composite metal oxide catalyst according to item (1) wherein the Group VIII metal is selected from the group consisting of Co, Ni or Fe, and the Group VIB metals are selected from the group consisting of Cr, Mo or W.

(3) The composite metal oxide catalyst according to item (1) which is comprised of the Group VIII metal $M_I$ and the Group VIB metals $M_{II}$ and $M_{III}$, including 3 active species having structures of $M_I\text{-}M_{II}\text{-}O$, $M_I\text{-}M_{III}\text{-}O$ and $M_I\text{-}M_{II}\text{-}M_{III}\text{-}O$, wherein the molar ratio of the Group VIII metal $M_I$ to the Group VIB metals $M_{II}+M_{III}$ is from 1:9 to 9:1 and wherein the molar ratio of the Group VIB metal $M_{II}$ to the Group VIB metal $M_{III}$ is from 1:5 to 5:1.

(4) The composite metal oxide catalyst according to item (1) wherein said the molar ratio of the Group VIII metal $M_I$ to the Group VIB metals $M_{II}+M_{III}$ is from 1:6 to 6:1 and wherein the molar ratio of the Group VIB metal $M_{II}$ to the Group VIB metal $M_{III}$ is from 1:3 to 3:1.

(5) The composite metal oxide catalyst according to item (1) wherein the molar ratio of the Group VIII metal $M_I$ to the Group VIB metals $M_{II}+M_{III}$ is from 1:3 to 3:1 and wherein the molar ratio of the Group VIB metal $M_{II}$ to the Group VIB metal $M_{III}$ is from 1:2 to 2:1.

(6) The composite metal oxide catalyst according to item (1) which is comprised of CoMoW or NiMoW with a particle size of 10 to 100 nanometers.

(7) A process for preparing the composite metal oxide catalyst according to item (1), comprising the step of:

Reacting an aqueous solution of a basic carbonate of the at least one type of Group VIII metal with an aqueous solution containing soluble salts of the at least two types of Group VIB metals and a surfactant.

(8) The process according to item (7) wherein the basic carbonate of the at least one type of Group VIII metal in the aqueous solution has a concentration of from 0.1 mol/L to 0.9 mol/L and in the aqueous solution containing soluble salts of the at least two types of Group VIB metals and the surfactant the metal ion concentration of the at least two types of Group VIB metals is from 0.03 mol/L to 0.3 mol/L and the concentration of the surfactant is from 1 wt % to 5 wt %.

(9) The process according to item (7) wherein the reaction is conducted at a temperature of 50° C. to 250° C. for 4 to 25 hours.

(10) A process for preparing the composite metal oxide catalyst according to item (1), comprising the steps of:

a) Adding a basic carbonate of the Group VIII metal into water to form a suspension with the basic carbonate concentration of from 0.1 mol/L to 0.9 mol/L;

b) Adding soluble salts of the Group VIB metals into water to form a solution with the metal ion concentration of from 0.03 mol/L to 0.3 mol/L, adding a surfactant to the solution such that the surfactant in the solution has a concentration of from 1 wt % to 5 wt %, and heating the solution to a temperature of from 50° C. to 250° C. under stirring;

c) Adding the suspension obtained in step a) into the solution in step b) and reacting at a temperature of 50° C. to 250° C. for 4 to 25 hours; and d) Filtering, washing and drying the product obtained in step c) to obtain the target product.

(11) The process according to item (7) wherein the soluble salts of the at least two Group VIB metals comprise one selected from the group consisting of ammonium molybdate and sodium molybdate and one selected from the group consisting of ammonium tungstate, ammonium metatungstate and sodium tungstate.

(12) The process according to item (7) wherein the surfactant is selected from the group consisting of hexadecyltrimethylammonium bromide, hexadecyltrimethylammonium chloride, octadecyltrimethylammonium bromide and octadecyltrimethylammonium chloride.

(13) Use of the composite metal oxide catalyst according to item (1) in hydrodesulfurization reaction of diesel.

(14) The use according to item (13) wherein in the hydrodesulfurization reaction of diesel, the temperature is from 280° C. to 400° C., the pressure of hydrogen is from 1 MPa to 20 MPa, the ratio of hydrogen to the diesel from 50 $Nm^3/m^3$ to 1000 $Nm^3/m^3$, and the weight hourly space velocity (WHSV) of the raw materials is from 0.1 $h^{-1}$ to 10 $h^{-1}$.

(15) The use according to item (13) wherein prior to the hydrodesulfurization reaction of diesel, the catalyst is pretreated as follows:

(i) Calcining at a temperature from 350° C. to 550° C. under an atmosphere of air;

(ii) Pulverizing, kneading and molding; and (iii) sulfurizing in situ in a hydrodesulfurization fixed-bed reactor at 300° C. to 450° C. with the mixed gas of a sulfur-containing compound and hydrogen, wherein the volume content of sulfur-containing compound in the mixed gas is 10%.

(16) The use according to item (13) wherein the sulfur-containing compound is hydrogen sulfide, carbon disulfide or dimethyl sulfide.

Compared with the known technologies, the multi-metal bulk catalyst of this invention has the following advantages.

1. The raw materials for synthesis of the catalyst in this invention are ordinary and cheap the preparation process is easy to operate, and it is the environmental friendly. It is easy to realize the production of catalyst in the industrial scale.

2. The catalyst synthesized by this invention exhibits a uniformly distribution with nano-sized particle and relatively highly distributed particle and the layered structure is kept from the basic carbonate to the final catalyst. The catalyst synthesized by this invention exhibits active species of composite structure of multi-metals oxide, thereby improve the HDS activity of the catalyst.

3. The catalyst in this invention exhibits a super high HDS activity in the ultra-deep HDS of diesel. Under the mild operating condition, the sulfur level in the actual diesel can be reduced from 1200 ppm to 27 ppm, achieving the objective of ultra-deep HDS. Upon characterizations of the catalyst by $H_2$-TPR and UV-Vis, $NiWO_4$, $NiMoO_4$ and Ni—Mo—W—O composite metal oxide active species can be detected. The active species of composite structure of multi-metals oxide are formed and lead to the excellent HDS activity of the final catalyst.

DETAILED DESCRIPTION OF THE INVENTION

Figure 1:
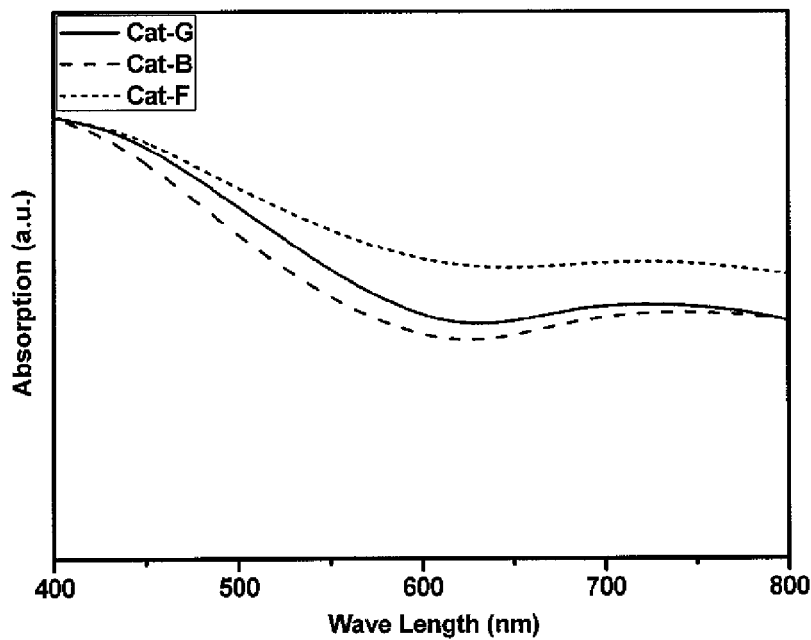
FIG. 1 is the UV-Vis spectra of the oxide precursors of NiMoW catalysts as prepared in Examples 2, 6 and 7.

One aspect of this invention provides a composite metal oxide catalyst, which has a particle size of 10 nm to 100 nm and active species of composite structure of multi-metal oxides, which is comprised of one type of Group VIII metal and two types of Group VIB metals wherein the molar ratio of Group VIII metal to Group VIB metals is from 1:9 to 9:1, preferably from 1:6 to 6:1, more preferably from 1:4 to 4:1, and the molar ratio of the two types of Group VIB metals is from 1:5 to 5:1, preferably from 1:3 to 3:1, more preferably from 1:2 to 2:1.

After characterizations of the catalyst by $H_2$-TPR and UV-Vis, active species of $M_I$-$M_{II}$-O, $M_I$-$M_{III}$-O and $M_I$-$M_{II}$-$M_{III}$-O are detected, which prove that some active species with composite structure of metal oxide are formed during the preparation of the catalyst in the invention.

In another aspect of this invention, it provides a preparation method for the catalyst, comprising the steps of:

a) Adding a basic carbonate of the Group VIII metal to water to form a suspension with the basic carbonate concentration of from 0.1 mol/L to 0.9 mol/L;

b) Adding soluble salts of the two types of Group VIB metals into water to form a solution with the metal ion concentration of from 0.03 mol/L to 0.3 mol/L, adding a surfactant to the solution such that the concentration of the surfactant in the solution is from 1 wt % to 5 wt %, and heating the solution to a temperature from 50° C. to 250° C. under stirring;

c) Adding the suspension in step a) to the solution in step b), reacting them at 50° C. to 250° C. for 4 to 25 hours, preferably 8 to 25 hours, more preferably 16 to 25 hours;

wherein the reaction temperature in step b) and c) is preferably 50° C. to 200° C., more preferably 50° C. to 120° C.; and d) Filtering, washing and drying the product obtained in step c) to obtain the target product.

The surfactant is hexadecyltrimethylammonium bromide, hexadecyltrimethylammonium chloride, octadecyltrimethylammonium bromide, or octadecyltrimethylammonium chloride, preferably hexadecyltrimethylammonium bromide, or hexadecyltrimethylammonium chloride, more preferably hexadecyltrimethylammonium chloride.

In the preparation method, said Group VIB metal salt is ammonium molybdate, sodium molybdate, ammonium tungstate, ammonium metatungstate or sodium tungstate, preferably ammonium molybdate, ammonium tungstate, or ammonium metatungstate.

Upon characterizations of the multi-metal unsupported catalyst prepared by the invention by $H_2$-TPR and UV-Vis, $Ni(Co)WO_4$, $Ni(Co)MoO_4$ and $Ni(Co)$—Mo—W—O composite metal oxide active species are detected therein, which prove that some active species with composite structure of metal oxide are formed.

The multi-metal unsupported catalyst prepared by this invention can be applied in ultra-deep HDS of diesel, wherein the reaction temperature is from 280° C. to 400° C., the pressure of hydrogen is from 1 MPa to 20 MPa, the volume ratio of hydrogen to diesel is from 50 $Nm^3/m^3$ to 1000 $Nm^3/m^3$ and the weight hourly space velocity (WHSV) of the raw material is from 0.1 $h^{-1}$ to 10 $h^{-1}$.

Prior to the hydrodesulfurization reaction of diesel, the catalyst is pre-treated as follows:

(i) Calcining at a temperature from 350° C. to 550° C. under an atmospheres of air;

(ii) Pulverizing, kneading and molding; and (iii) Sulfurizing in situ in a hydrodesulfurization fixed-bed reactor at 300° C. to 450° C. with the mixed gas of a sulfur-containing compound and hydrogen, wherein the volume content of sulfur-containing compound in the mixed gas is 10%, wherein the sulfur-containing compound may be hydrogen sulfide, carbon disulfide, or dimethyl sulfide.

FIG. 1 is the UV-Vis spectra of the precursors of NiMoW catalysts as prepared in Example 2, 6 and 7. It can be observed from the spectra that there is only a broad peak at about 720 nm, while there is no peak at 650 nm in the spectra of precursor between 600 nm and 800 nm. It is proved that the Ni metal in the catalyst is mainly existed in the form of octahedrally coordinated $Ni^{2+}$ instead of tetrahedrally coordinated $Ni^{2+}$, which forms as $NiWO_4$—, $NiMoO_4$— and Ni—Mo—W—O-like active species with Mo and W.

Figure 2:
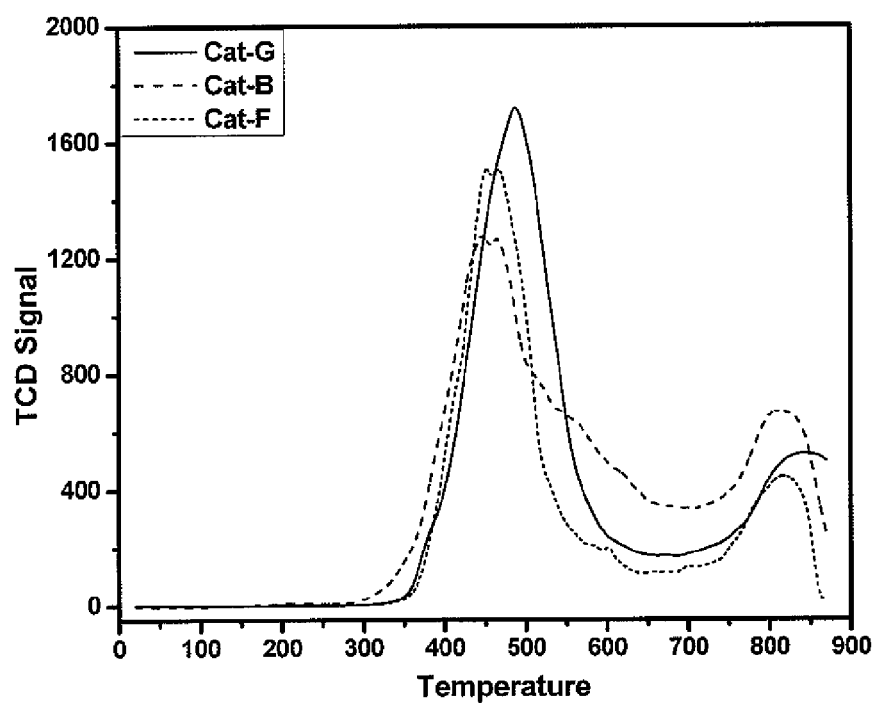
FIG. 2 is the $H_2$-TPR profiles of the oxide precursors of NiMoW catalysts as prepared in Examples 2, 6 and 7.

FIG. 2 is the $H_2$-TPR profiles of the oxide precursors of NiMoW catalysts as prepared in Example 2, 6 and 7. We could find out the characteristic peaks of different species according to the data from references. As seen in the $H_2$-TPR profiles of Cat-F, it is observed that the shoulder peak at about 420° C. can be assigned to the reduction of $Ni^{2+}$ species, the intense peak at 450° C. can be assigned to $Ni^{2+}$ species or polymeric octahedral Mo species, the intense peak at 475° C. can be assigned to $NiMoO_4$-like species or polymeric octahedral Mo species, the intense peak from 480° C. to 600° C. can be assigned to polymeric octahedral Mo species, and the peak above 800° C. can be assigned to the reduction of W species. The same characteristic peaks could be observed in Cat-B, wherein the shoulder peaks at about 600° C. and 700° C. are assigned to octahedrally coordinated Ni species and tetrahedrally coordinated Mo species, respectively. For Cat-G, it can be seen that $NiMoO_4$-like species is the primary species in the catalyst. Furthermore, the reduction peak of W species in the oxide precursors of the catalysts is shifted to the high temperature, which demonstrates the interaction between Ni and Mo species. So, according to the results of characterizations, it can be explained that $NiWO_4$—, $NiMoO_4$— and Ni—Mo—W—O-like active species with composite structure are formed between the 3 active metals in the catalyst of this invention.

Figure 3:
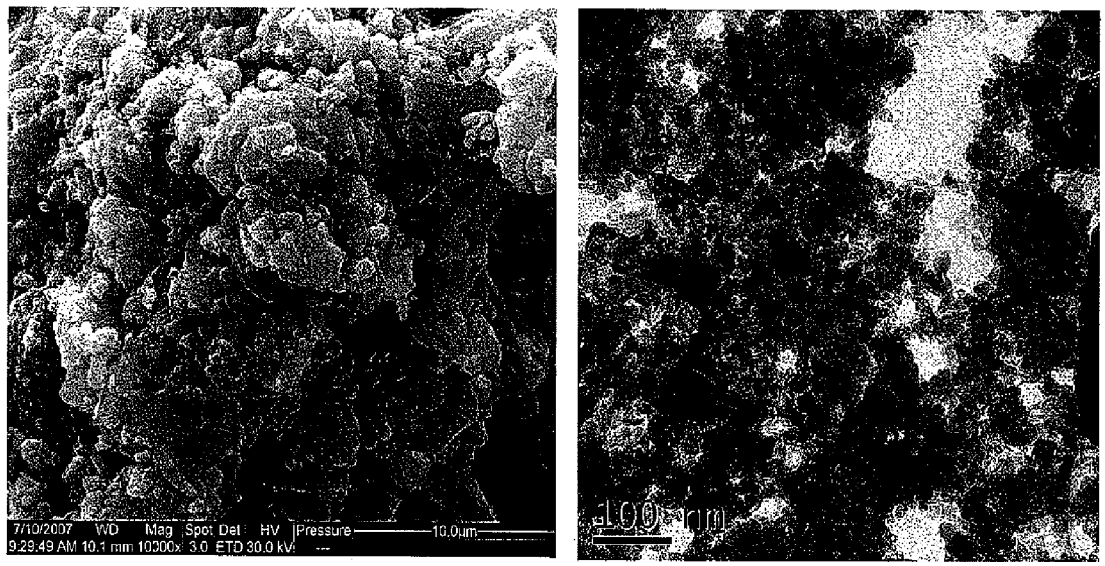
FIG. 3 is the SEM and TEM images of the present NiMoW catalyst after sulfidation as prepared in Example 1: (a) SEM image of the NiMoW catalyst after sulfidation; and (b) TEM image of the NiMoW catalyst after sulfidation.

FIG. 3 is the SEM and TEM images of the present NiMoW catalyst after sulfidation as prepared in Example 1: (a) SEM image of the NiMoW catalyst after sulfidation; and (b) TEM image of the NiMoW catalyst after sulfidation. According to the TEM image, the catalyst shows a uniformly and highly distributed particle with nano-size. Through further TEM tests, different crystalline lattice fringes of the corresponding metal sulfides could be clearly distinguished; and it can be deduced that the catalyst prepared in this invention with shorter slab length and less stacking degree has higher activity than that of the catalyst reported in references of the prior art.

Figure 4:
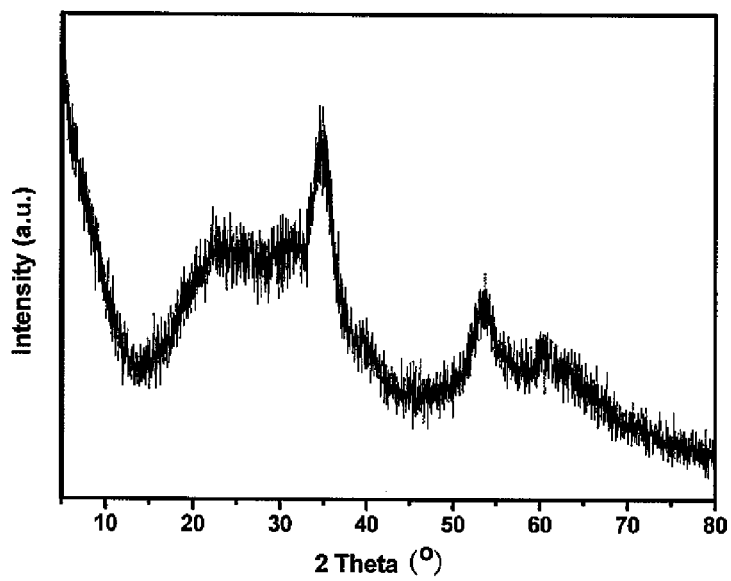
FIG. 4 is the XRD patterns of the nickel basic carbonate prepared by the method.

FIG. 4 is the XRD patterns of the nickel basic carbonate prepared by the method, which has the characteristic layered structure as observed in the XRD patterns.

EXAMPLES

The following examples are provided for purpose of further illustrate the invention, but are not intended to limit the scope of the invention as defined in the attached claims. For example, the multi-metal unsupported catalyst with nano-size particle that is comprised of one Group VIII metal and two Group VIB metals can be prepared according to the experimental results of this invention, wherein the Group VIII metal can be Co, Ni, Fe or the like, and the Group VIB metal can be Cr, Mo, W or the like.

Example 1

Preparation of NiMoW Unsupported Catalyst in the Invention a). Preparation of nickel basic carbonate:

150 ml aqueous $Na_2CO_3$ solution with the $Na_2CO_3$ concentration of 0.2 mol/L and $Ni(NO_3)_2$ (5.481 g, 0.03 mol $Ni^{2+}$) were used as starting materials, and reacted at 90° C. for 1 hour to synthesize a green precipitate by co-precipitation method. After washing and drying the precipitate at 120° C., green powders obtained were self-made nickel basic carbonate. Compared with the amorphous structure and no significant special structure of commercial nickel basic carbonate (from Aldrich), the self-made nickel basic carbonate in this invention exhibited a layered structure, according to the XRD patterns.

b). Ammonium molybdate (1.766 g, 0.01 mol $Mo^{6+}$) and ammonium metatungstate (2.463 g, 0.01 mol $W^{6+}$) were weighed and dissolved in the mixture solvent of 350 ml water and 1 g hexadecyltrimethylammonium chloride to form a solution, which was heated to 120° C. under continuous stirring to produce a colourless transparent solution. The nickel basic carbonate made by step a) was added into 50 ml water to form a suspension which was heated to 120° C. The suspension was added into the colourless transparent solution slowly to produce a light green reaction liquid, which was reacted at a reaction temperature of 150° C. for 20 hours under reflux. The precipitate obtained in the reaction was filtered, washed and dried at 120° C. to obtain yellowish green powders.

c). After calcining the yellowish green powders at a temperature of 400° C. under an atmosphere of air for 2 hours, an oxide precursor of the NiMoW catalyst was obtained as brownish green powders. The yield of the precursor was 96.6% and the formula thereof was $4.6NiO.MoO_3.WO_3$. Before performing HDS reaction and some characterizations, the precursor of the catalyst was sulfided under a mixed gas of hydrogen containing 10 vol % $H_2S$. The sulfidation reaction was conducted at 400° C. for 2 hours, wherein the flow rate of the mixed gas of $H_2S$ and $H_2$ was 60 ml/min.

The composite metal oxide catalyst prepared in this example was denoted as Cat-A as brownish green powders with the yield of 95%. The TEM and SEM images of Cat-A were shown in FIG. 3, from which it can be observed that the catalyst was consisted of uniform size and highly distributed nano-particles with an average size of about 30 nm.

Example 2

The composite metal oxide catalyst denoted as Cat-B was prepared by the same method as Example 1 except that 1 g hexadecyltrimethylammonium bromide was used instead of 1 g hexadecyltrimethylammonium chloride used in Example 1. Cat-B also had a similar morphology to Cat-A. The yield of Cat-B was 95%.

Example 3

The composite metal oxide catalyst denoted as Cat-C was prepared by the same method as Example 1 except that 1 g octadecyltrimethylammonium bromide was used instead of 1 g hexadecyltrimethylammonium chloride used in Example 1. Cat-C also had a similar morphology to Cat-A. The yield of Cat-C was 96%.

Example 4

The composite metal oxide catalyst denoted as Cat-D was prepared by the same method as Example 1 except that the reaction temperature was 50° C. instead of 150° C. in Example 1. Cat-D also had a similar morphology to Cat-A. The yield of Cat-D was 90%.

Example 5

The composite metal oxide catalyst denoted as Cat-E was prepared by the same method as Example 1 except that the reaction temperature was 250° C. instead of 150° C. in Example 1. Cat-E also had a similar morphology to Cat-A. The yield of Cat-E was 91%.

Example 6

The composite metal oxide catalyst denoted as Cat-F was prepared by the same method as Example 1 except that the commercial nickel basic carbonate (Aldrich, Nickel(II) carbonate basic hydrate with a production number of 39380740) was used instead of the self-made nickel basic carbonate in Example 1. Cat-F also had a similar morphology to Cat-A. The yield of Cat-F was 97%.

Example 7

The composite metal oxide catalyst denoted as Cat-G was prepared by the same method as Example 1 except that the ammonium tungstate was used instead of the ammonium metatungstate in Example 1. Cat-G also had a similar morphology to Cat-A. The yield of Cat-G was 91%.

Example 8

The composite metal oxide catalyst denoted as Cat-H was prepared by the same method as Example 1 except that the sodium molybdate and sodium tungstate were used instead of the ammonium molybdate and ammonium metatungstate in Example 1, respectively. Cat-H also had a similar morphology to Cat-A. The yield of Cat-H was 91%.

Example 9

The composite metal oxide catalyst denoted as Cat-I was prepared by the same method as Example 1 except that in the reaction step a, 50 ml aqueous $Na_2CO_3$ solution with the $Na_2CO_3$ concentration of 0.2 mol/L and $Ni(NO_3)_2$ (1.827 g, 0.01 mol $Ni^{2+}$) were used instead of 150 ml aqueous $Na_2CO_3$ solution with the $Na_2CO_3$ concentration of 0.2 mol/L and $Ni(NO_3)_2$ (5.481 g, 0.03 mol $Ni^{2+}$), and in the reaction step b, ammonium metatungstate (4.926 g, 0.02 mol $W^{6+}$) was used instead of ammonium metatungstate (2.463 g, 0.01 mol $W^{6+}$), that is, the composite metal oxide catalyst denoted as Cat-I was prepared by the same method as Example 1 except that the ratio of Ni:Mo:W=1:1:2 was used instead of Ni:Mo:W=3:1:1 in Example 1. Cat-I also had a similar morphology to Cat-A. The yield of Cat-I was 90%.

Example 10

The composite metal oxide catalyst denoted as Cat-J was prepared by the same method as Example 1 except that in the reaction step b, ammonium metatungstate (1.232 g, 0.005 mol $W^{6+}$) was used instead of the ammonium metatungstate (2.463 g, 0.01 mol $W^6$) in Example 1, that is, the composite metal oxide catalyst denoted as Cat-J was prepared by the same method as Example 1 except that the ratio of Ni:Mo:W=6:2:1 was used instead of Ni:Mo:W=3:1:1 in Example 1. Cat-J also had a similar morphology to Cat-A. The yield of Cat-J was 95%.

Example 11

The composite metal oxide catalyst denoted as Cat-K was prepared by the same method as Example 1 except that in the reaction step c, mixed gas of hydrogen containing 10 vol % $CS_2$ was used instead of the mixed gas of hydrogen containing 10 vol % $H_2S$ in Example 1. Cat-K was in the form of black powders.

Example 12

The composite metal oxide catalyst denoted as Cat-L was prepared by the same method as Example 1 except that in the reaction step c, mixed gas of hydrogen containing 10 vol % dimethyl sulfide instead of the mixed gas of hydrogen containing 10 vol % $H_2S$ in Example 1. Cat-L was in the form of black powders.

Example 13

The composite metal oxide catalyst denoted as Cat-M was prepared by the same method as Example 1 except that in the reaction step c, a calcining temperature of 350° C. was used instead of the calcining temperature of 400° C. in Example 1. Cat-M also had a similar morphology to Cat-A. The yield of Cat-M was 95%.

Example 14

The composite metal oxide catalyst denoted as Cat-N was prepared by the same method as Example 1 except that in the reaction step c, a calcining temperature of 550° C. was used instead of the calcinations temperature of 400° C. in Example 1. Cat-N also had a similar morphology to Cat-A. The yield of Cat-N was 95%.

Example 15

The composite metal oxide catalyst denoted as Cat-O was prepared by the same method as Example 1 except that in the reaction step b, the reaction time of 4 hours was used instead of the reaction time of 20 hours in Example 1. Cat-N also had a similar morphology to Cat-A. The yield was 85%.

Example 16

The composite metal oxide catalyst denoted as Cat-P was prepared by the same method as Example 1 except that in the reaction step c, the sulfidation temperature of 300° C. was used instead of the sulfidation temperature of 400° C. in Example 1. Cat-P was in the form of black powders.

Example 17

The results of $H_2$-TPR and UV-Vis characterizations for Cat-B, Cat-F, and Cat-D were shown in FIG. 1 and FIG. 2, from which active species of $M_I$-$M_{II}$-O, $M_I$-$M_{III}$-O and $M_I$-$M_{II}$-$M_{III}$-O structures can be detected, which prove that some active species with composite structure of multi metal oxides was formed during the preparation of the catalyst in the invention.

Example 18

Preparation of CoMoW Unsupported Catalyst in the Invention a. Ammonium molybdate (1.766 g, 0.01 mol $Mo^{6+}$) and ammonium metatungstate (2.463 g, 0.01 mol $W^{6+}$) were weighed and dissolved in the mixture solvent of 350 ml water and 5 ml hexadecyltrimethylammonium chloride to form a solution. The solution was heated to 120° C. under continuously stirring to form a colourless transparent solution, and then cobalt basic carbonate hydrate (Aldrich, Cobalt (II) carbonate basic hydrate with a production number of 513791) (3.208 g, 0.03 mol $Co^{2+}$) was weighed and added into 50 ml water to form a suspension which was heated to 120° C. The suspension was added into the colourless transparent solution slowly to form a light green reaction liquid and reacted at 150° C. for 20 hours under reflux. The precipitate obtained in the reaction was filtered, washed and dried at 120° C. to obtain orange powders.

b. After calcining the orange powders at a temperature of 400° C. under the atmosphere of air for 2 hours, oxide precursor of the CoMoW catalyst was obtained as orange powders. The yield of the precursor was 94.3% and the formula thereof was $3.9CoO.MoO_3.WO_3$. Before performing HDS reaction and some characterizations, the precursor of the catalyst was sulfided under a mixed gas of hydrogen containing 10 vol % $H_2S$. The sulfidation reaction was conducted at 400° C. for 2 hours, wherein the flow rate of the mixed gas of $H_2S$ and $H_2$ was 60 ml/min.

The composite metal oxide catalyst prepared in this example was denoted as Cat-Q. Cat-Q was brown powders with the yield of 90%.

Example 19

Evaluation of the Catalytic Performance of the Catalysts in HDS Reaction

The catalytic activities of the catalysts in this invention were evaluated in a fixed-bed reactor for the HDS of actual diesel with the sulfur content of 1200 ppm. The HDS reaction was performed under the conditions of 1 g of the catalyst, a reaction temperature of 300° C., a hydrogen pressure of 3.5 MPa, an $H_2$/diesel ratio of 600 $Nm^3H_2/m^3$ diesel, and a volume hourly space velocity of 6 $h^{-1}$. The sulfur content in the samples was determined by microcoulometry.

In the above HDS reactions of diesel, Cat-G has the highest HDS activity, which could reduce the sulfur content in the real diesel from 1200 ppm to 27 ppm.

Furthermore, the HDS activities of the other catalysts prepared in this invention were also evaluated and listed in Table 1.

TABLE 1

Comparison of the HDS activity of different catalysts

| Catalyst | Sulfur Content (ppm) |
| --- | --- |
| Cat-A | 31 |
| Cat-B | 55 |
| Cat-C | 50 |
| Cat-D | 48 |
| Cat-E | 56 |
| Cat-F | 85 |
| Cat-G | 27 |
| Cat-H | 70 |
| Feedstock Diesel | 1200 |
| Cat-I | 83 |
| Cat-J | 54 |
| Cat-K | 73 |
| Cat-L | 34 |
| Cat-M | 39 |
| Cat-N | 75 |
| Cat-O | 123 |
| Cat-P | 127 |
| Cat-Q | 91 |

In summary, a multi-metals unsupported catalyst with high HDS activity has been prepared in the invention, which is a kind of catalyst with uniformly and highly distributed nanoparticle and with the active species of multi-metals composite structure. The sulfur content in the real diesel could be reduced to 27 ppm through HDS under the mild operating conditions, which achieves the demand of ultra-deep HDS and has a significant potential application in industry.

What is claimed is:
1. A composite metal oxide catalyst, which is comprised of at least one type of Group VIII metal and at least two types of Group VIB metals, wherein the molar ratio of the at least one type of Group VIII metal to the at least two types of Group VIB metals is from 1:9 to 9:1 and among the at least two types of Group VIB metals, the molar ratio of the 2 largest contents of the metals is from 1:5 to 5:1, wherein the composite metal oxide catalyst is produced by a process comprising the steps of:
- a) adding a basic carbonate of the Group VIII metal into water to form a suspension with the basic carbonate concentration of from 0.1 mol/L to 0.9 mol/L, wherein the Group VIII metal is Ni, and the basic carbonate of the Group VIII metal has a layered structure;
- b) adding soluble salts of the Group VIB metals into water to form a solution with the metal ion concentration of from 0.03 mol/L to 0.3 mol/L, adding a surfactant to the solution such that the surfactant in the solution has a concentration of from 1 wt % to 5 wt %, and heating the solution to a temperature of from 50° C. to 250° C. under stirring;
- c) adding the suspension obtained in step a) into the solution in step b) and reacting at a temperature of 50° C. to 250° C. for 4 to 25 hours; and
- d) filtering, washing and drying the product obtained in step c) to obtain the target product.

2. The composite metal oxide catalyst according to claim 1 wherein the Group VIB metals are selected from the group consisting of Cr, Mo or W.

3. The composite metal oxide catalyst according to claim 1 which is comprised of the Group VIII metal $M_I$ and the Group VIB metals $M_{II}$ and $M_{III}$, including 3 active species having structures of $M_I$-$M_{II}$-O, $M_I$-$M_{II}$-O and $M_I$-$M_{II}$-$M_{III}$-O, wherein the molar ratio of the Group VIII metal $M_I$ to the Group VIB metals $M_{II}$+$M_{III}$ is from 1:9 to 9:1 and wherein the molar ratio of the Group VIB metal $M_{II}$ to the Group VIB metal $M_{III}$ is from 1:5 to 5:1.

4. The composite metal oxide catalyst according to claim 1 wherein said the molar ratio of the Group VIII metal $M_I$ to the Group VIB metals $M_{II}$+$M_{III}$ is from 1:6 to 6:1 and wherein the molar ratio of the Group VIB metal $M_{II}$ to the Group VIB metal $M_{III}$ is from 1:3 to 3:1.

5. The composite metal oxide catalyst according to claim 1 wherein the molar ratio of the Group VIII metal $M_I$ to the Group VIB metals $M_{II}$+$M_{III}$ is from 1:3 to 3:1 and wherein the molar ratio of the Group VIB metal $M_{II}$ to the Group VIB metal $M_{III}$ is from 1:2 to 2:1.

6. The composite metal oxide catalyst according to claim 1 which is comprised of NiMoW with a particle size of 10 to 100 nanometers.

7. A method for reducing sulfur level in a diesel comprising conducting a hydrodesulfurization reaction of the diesel in the presence of hydrogen and a composite metal oxide catalyst according to claim 1.

8. The method according to claim 7 wherein the hydrodesulfurization reaction is conducted at a temperature from 280° C. to 400° C., a pressure of hydrogen from 1 MPa to 20 MPa, a ratio of hydrogen to the diesel from 50 $Nm^3/m^3$ to 1000 $Nm^3/m^3$, and the weight hourly space velocity (WHSV) of the raw materials from $0.1\ h^{-1}$ to $10h^{-1}$.

9. The method according to claim 7 wherein prior to the hydrodesulfurization reaction, the catalyst is pre-treated as follows:
- (i) calcining at a temperature from 350° C. to 550° C. under an atmosphere of air;
- (ii) pulverizing, kneading and molding; and
- (iii) sulfurizing in situ in a hydrodesulfurization fixed-bed reactor at 300° C. to 450° C. with a mixed gas of a sulfur-containing compound and hydrogen, wherein the volume content of the sulfur-containing compound in the mixed gas is 10%.

10. The method according to claim 9 wherein the sulfur-containing compound is hydrogen sulfide, carbon disulfide, or dimethyl sulfide.

11. A process for preparing a composite metal oxide catalyst which is comprised of at least one type of Group VIII metal and at least two types of Group VIB metals, wherein the molar ratio of the at least one type of Group VIII metal to the at least two types of Group VIB metals is from 1:9 to 9:1 and among the at least two types of Group VIB metals, the molar ratio of the 2 largest contents of the metals is from 1:5 to 5:1, comprising the steps of:
- a) adding a basic carbonate of the Group VIII metal into water to form a suspension with the basic carbonate concentration of from 0.1 mol/L to 0.9 mol/L, wherein the Group VIII metal is Ni, and the basic carbonate of the Group VIII metal has a layered structure;
- b) adding soluble salts of the Group VIB metals into water to form a solution with the metal ion concentration of from 0.03 mol/L to 0.3 mol/L, adding a surfactant to the solution such that the surfactant in the solution has a concentration of from 1 wt % to 5 wt %, and heating the solution to a temperature of from 50° C. to 250° C. under stirring;
- c) adding the suspension obtained in step a) into the solution in step b) and reacting at a temperature of 50° C. to 250° C. for 4 to 25 hours; and
- d) filtering, washing and drying the product obtained in step c) to obtain the target product.

12. The process according to claim 11 wherein the soluble salts of the at least two Group VIB metals comprise one selected from the group consisting of ammonium molybdate and sodium molybdate and one selected from the group consisting of ammonium tungstate, ammonium metatungstate and sodium tungstate.

13. The process according to claim 11 wherein the surfactant is selected from the group consisting of hexadecyltrimethylammonium bromide, hexadecyltrimethylammonium chloride, octadecyltrimethylammonium bromide and octadecyltrimethylammonium chloride.

* * * * *